United States Patent
Ter-Borch (10) Patent No.: US 9,631,360 B2
(45) Date of Patent: Apr. 25, 2017

(54) INSULATING WALL SYSTEM FOR A BUILDING STRUCTURE

(71) Applicant: Rockwool International A/S, Hedehusene (DK)

(72) Inventor: Hans Henrik Ter-Borch, Holbæk (DK)

(73) Assignee: Rockwool International A/S, Hedehusene (DK)

( * ) Notice: Subject to any disclaimer, the term of this patent is extended or adjusted under 35 U.S.C. 154(b) by 0 days.

(21) Appl. No.: 14/440,726

(22) PCT Filed: Nov. 14, 2013

(86) PCT No.: PCT/EP2013/073799
§ 371 (c)(1),
(2) Date: May 5, 2015

(87) PCT Pub. No.: WO2014/076168
PCT Pub. Date: May 22, 2014

(65) Prior Publication Data
US 2015/0300004 A1    Oct. 22, 2015

(30) Foreign Application Priority Data
Nov. 15, 2012 (DK) .............................. 2012 00182 U (51) Int. Cl.
*E04B 1/76* (2006.01)
*E04F 13/08* (2006.01)
*F16B 15/00* (2006.01)

(52) U.S. Cl.
CPC .......... *E04B 1/7637* (2013.01); *E04B 1/7629* (2013.01); *E04F 13/0803* (2013.01); *F16B 15/0046* (2013.01); *E04B 1/7612* (2013.01)

(58) Field of Classification Search
CPC ................................................... F16B 15/0046
See application file for complete search history.

(56) References Cited

U.S. PATENT DOCUMENTS

| | | | | |
|---|---|---|---|---|
| 1,672,639 A | * | 6/1928 | Davis | 52/404.2 |
| 3,362,120 A | * | 1/1968 | Warren | 52/309.2 |
| 3,772,840 A | * | 11/1973 | Hala | 52/302.3 |
| 3,863,621 A | * | 2/1975 | Schoenfelder | 126/633 |
| 4,224,773 A | * | 9/1980 | Schworer | 52/315 |
| 4,471,591 A | * | 9/1984 | Jamison | 52/309.9 |

(Continued)

FOREIGN PATENT DOCUMENTS

| | | |
|---|---|---|
| CA | 1225251 A1 | 8/1987 |
| DE | 202007003616 U1 | 9/2008 |

(Continued)

*Primary Examiner* — Babajide Demuren
(74) *Attorney, Agent, or Firm* — Dinsmore & Shohl LLP (57) ABSTRACT

The present invention concerns an insulating wall system for a building structure, wherein said wall system comprises a first wall having an exterior surface with insulation material fitted to said exterior surface of said first wall and retained by at least one elongated support member abutting the insulation material which via fastening members extending through the insulation material substantially perpendicular to the exterior surface is anchored in the first wall, and wherein the elongated support member comprises an elongated beam with one or more nail plates mounted on the insulation abutting inner surface of said beam for enhancing friction.

12 Claims, 6 Drawing Sheets

(56) References Cited

U.S. PATENT DOCUMENTS

| | | | | |
|---|---|---|---|---|
| 4,680,913 | A * | 7/1987 | Geisen et al. | 52/746.1 |
| 4,741,137 | A * | 5/1988 | Barratt | 52/314 |
| 4,885,887 | A * | 12/1989 | Simmons et al. | 52/410 |
| 4,969,302 | A * | 11/1990 | Coggan et al. | 52/309.8 |
| 5,094,057 | A * | 3/1992 | Morris | 52/511 |
| 5,743,056 | A * | 4/1998 | Balla-Goddard et al. | 52/309.11 |
| 6,561,726 | B1 * | 5/2003 | Hecken et al. | 403/389 |
| 7,162,845 | B2 * | 1/2007 | Messiqua | 52/404.1 |
| 2009/0277119 | A1 * | 11/2009 | Holm et al. | 52/506.05 |
| 2009/0293419 | A1 * | 12/2009 | Gharibeh et al. | 52/782.1 |
| 2009/0301026 | A1 | 12/2009 | Kaczmarek et al. | |
| 2010/0115872 | A1 * | 5/2010 | Holm et al. | 52/506.06 |
| 2011/0250035 | A1 * | 10/2011 | Goldberg | E04B 2/707 |
| | | | | 411/366.1 |
| 2013/0205695 | A1 * | 8/2013 | Newell | 52/235 |
| 2013/0291465 | A1 * | 11/2013 | Resso | 52/302.1 |
| 2013/0326991 | A1 * | 12/2013 | Chauncey | 52/582.1 |

FOREIGN PATENT DOCUMENTS

| | | | | |
|---|---|---|---|---|
| DE | 102009047671 A1 * | 6/2011 | | B29C 65/344 |
| DE | 102010047242 A1 * | 4/2012 | | E04B 1/7633 |
| DE | 102012102862 A1 * | 8/2013 | | E04B 1/4178 |
| EP | 1160386 A1 | 12/2001 | | |
| FR | 2544765 A1 | 10/1984 | | |
| FR | 2599403 A1 | 12/1987 | | |
| GB | 2049857 A | 12/1980 | | |
| KR | 20090112938 A | 10/2009 | | |
| SE | CA 2453030 A1 * | 1/2003 | | B65D 19/0095 |
| WO | 2008128928 A1 | 10/2008 | | |
| WO | 2010023649 A1 | 3/2010 | | |
| WO | WO 2011000378 A2 * | 1/2011 | | |

\* cited by examiner

FIG. 1

Prior Art

FIG. 2

Prior Art

INSULATING WALL SYSTEM FOR A BUILDING STRUCTURE

CROSS-REFERENCE TO RELATED APPLICATIONS

This application is the U.S. National Phase of PCT/EP2013/073799 filed Nov. 14, 2013, which claims priority of Danish Patent Application BA 2012 00182 filed Nov. 15, 2012.

The present invention relates to an insulating wall system for a building structure, wherein said wall system comprises a first wall having an exterior surface with insulation material fitted to said exterior surface of said first wall and retained by at least one elongated support member abutting the insulation material which via fastening members extending through the insulation material substantially perpendicular to the exterior surface is anchored in the first wall.

WO 2007/110244 A1 discloses an insulating wall system of the above-mentioned kind, where the elongated support member may be a wooden beam or a steel profile, which is formed with a specific shape providing sufficient stiffness so that the profile does not bend along its longitudinal axis when fitted by pre-stressed fasteners. In the central portion of the profile there is provided mounting holes and friction enhancing knobs, such as an array of rearwardly extending embossings. The façade cladding may be mounted on the outside of the steel profiles.

An insulating wall system is also known from DE 197 03 874 A1. The insulating wall system disclosed therein is a vertical wooden outer wall structure of a building construction, where insulation slabs are fixed to the wooden inner wall by a number of support beams that are positioned on the outside of the insulation and secured to the inner wall by a number of screws penetrating through the insulation material with an angle of 60° to 80° relative to horizontal. A building facade is mounted on the support beams. Hereby, the screws can transfer the weight of the outer façade structure onto the inner wall, which is mounted on a building base structure.

This type of wall system is suitable for mounting of an outer wall insulation cover of existing building, but is limited to the amount of insulation material that can be mounted due to the required length of the screws.

However, in order to meet modern requirements to the insulation thickness of buildings, which may be up to 300 mm or more, it is difficult to design suitable screws that can penetrate the insulation layer in an inclined angle, as these must be exceptionally long and thereby difficult to handle and ensure that they are properly fastened onto the inner wall behind the insulation.

Further it is readily acknowledged in the building industry that the amount of penetrations of the insulation cover must be limited in order to avoid jeopardising the insulating effect of the insulation cover.

The invention consists of an insulating wall system for a building structure, wherein said wall system comprises a first wall having an exterior surface with insulation material fitted to said exterior surface of said first wall and retained by at least one elongated support member abutting the insulation material which via fastening members extending through the insulation material substantially perpendicular to the exterior surface is anchored in the first wall, and wherein the elongated support member comprises an elongated beam with one or more nail plates mounted on the insulation abutting inner surface of said beam for enhancing friction. Meaning the strength of the insulation is utilized in order to support the façade cladding covering said insulating wall system.

The general principle of utilizing the strength of the insulation to support the facade cladding is known from e.g. WO 2007/110244 A1, where the support members in a preferred embodiment are steel profiles with friction enhancing knobs on the rear side of the steel profile. The present invention is advantageous compared with the system of WO 2007/110244 A1 since it is less costly to produce and more flexible for builders to work with on a building site. The nail plate or plates on the rear side of the elongated support member is advantageous in order to utilize the strength of the insulation to support the facade cladding. Hereby the dependency of a top beam of the wall system can be eliminated and it is possible to use the system on taller buildings and at areas where there is no top beam.

The insulation material according to the present invention includes at least one layer of fibrous insulation material; said fibrous insulation material preferably being a mineral fibre material, e.g. made of glass or stone fibres bonded with a binding agent. However, it is realized that also foam products such as EPS or XPS, or any combination of products may be applied. The insulation material may include two layers for providing extra thickness of the insulation. In particular, the insulation material is preferably mineral fibre boards having a density of 50 to 100 kg/m$^3$, more preferably approx. 70 kg/m$^3$. In order to optimally utilize the strength of such insulation material said material provides a resistance to compression loads in the direction of its thickness of at least 7.5 kPa, preferably at least 10 kPa, more preferably at least 15 kPa at 10% strain in accordance with European Standard EN 826; expressed as compressive stress at 10% strain, CS(10).

Preferably, the elongated support member is a wooden beam, e.g. a LVL (Laminated Veneer Lumber) plank. Hereby, the support members can be made on the building site using relative simple and inexpensive material. They may moreover be treated, e.g. cut to size in a simple manner with standard tools according to the needs on site. Such LVL planks may have a thickness of about 25 to 30 mm in order to secure sufficient ventilation of the façade system and a width of approx. 100 mm.

The wooden planks as well as the nail plates can be compactly stored and transported which also contributes to a cost effective wall system due to relatively low transport and storage costs. By the term nail plates in the context of the present disclosure is meant an element added to the elongated beam and which has protrusions projecting out of a surface of the element for penetration into the insulation material. In relation to wooden planks it is found advantageous to use nail plates also having at least one spike protruding out of the opposite surface of element and towards the wooden beam so that the nail plate can easily be mounted on the wooden beam, e.g. by hammering the nail plate to the wooden beam.

Accordingly, the nail plates are provided with spikes projecting out of the inner surface and penetrating into the outer surface of the insulation material. Hereby, an enhanced friction and thereby fixed positioning of the support members onto the insulation is provided enabling a wall system according to the invention to carry an outer façade cladding with a relatively high weight. Due to the spikes penetrating significantly into the insulation material it is even possible to stick and temporarily secure the support members to the insulation before they are finally retained by the fastening members. Thus a single builder will be enabled to mount the wall system in a time and cost efficient manner.

In an alternative embodiment, the elongated beam may be a metal profile, such as a steel profile, with at least one nail plate mounted thereon, e.g. by welding. Alternatively, the nail plates could also be mounted to the elongated support member by adhesives, such as tape or glue.

In the preferred embodiment, the beam or beams are provided with a plurality of nail plates with mutual predetermined distance. Hereby, the beams may be provided with a predetermined number of nail plates in accordance with the actual load requirements.

In the following, the invention is described in more detail with reference to the accompanying drawings, in which.

Figure 1:
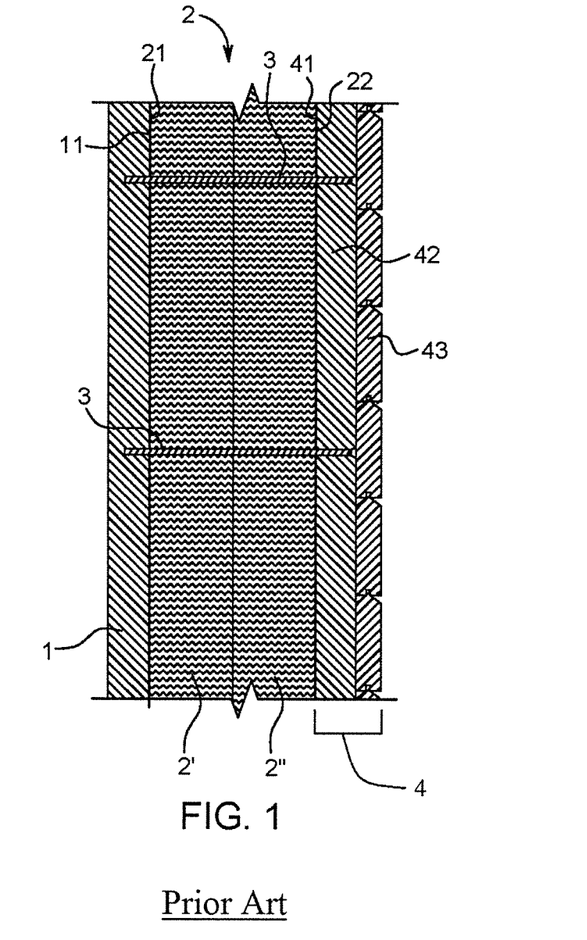
FIG. 1 is a schematic cross-section detailed view of a wall system according to the prior art using the principles of the invention.

FIG. 1 shows a wall system according to the prior art as disclosed in WO 2007/110244. According to FIG. 1, a first wall 1 is provided, said first wall being an inner wall in the present embodiment. On the outside surface 11 of this inner wall 1, slabs of fibrous insulation 2 are provided, and this insulation material 2 is fixed to the inner wall 1 by a number of fastening members 3 which are mounted through an outer wall elongated support member 42 of the outer wall 4 and through the insulation 2. The second wall 4, in the present embodiment the outer wall 4, further includes an external wall cover 43 which may be facade panels or wooden cover or the like, which are mounted on the preferably vertically disposed elongated support members 42.

In the example shown in FIG. 1, a wooden wall structure is shown. In order to meet predetermined heat insulation requirements of a specific wall structure, one or more layers of insulation material 2 may be provided. As an example, two layers of insulation material 2', 2" are shown in FIG. 1.

The fastening members 3 are screws which are mounted with pre-stressed, i.e. with a permanent tension load provided in the screws 3 deriving from a compression of the insulation material 2 and the elastic properties of such material.

Figure 2:
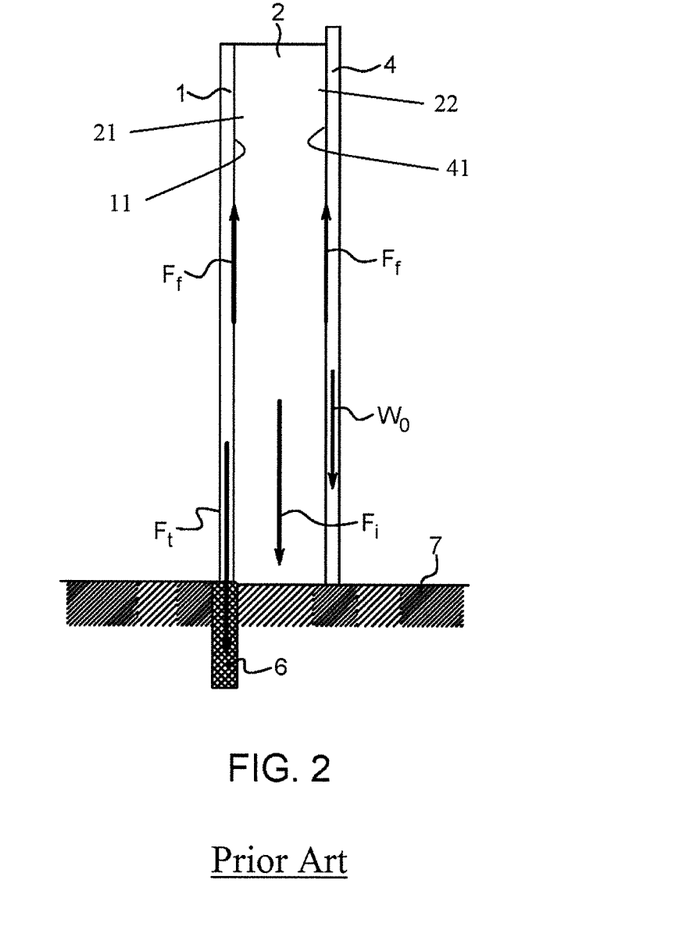
FIG. 2 is a schematic view of a wall system according to the prior art illustrating the distribution of forces.

Now referring to FIG. 2; as a result of the permanent tension in the fastening screws 3, a normal force $F_n$ is created between the outer surface 22 of the insulation material 2 and the inner surface 41 of the outer wall structure 4. The same normal force is also created between the inner surface 21 of the insulation material 2 and the external surface 11 of the inner wall 1. This means that a friction force $F_f$ is established whereby the load $W_o$ of the outer wall 4 is transferred to the inner wall 1, which—as shown in FIG. 2—is mounted on a building foundation 6 in the ground 7. Hereby, the weight $F_t$ of the entire wall system is transferred to the foundation through the inner wall. In other circumstances, the weight and the load of the insulation material $F_i$ may be transferred to the foundation (not shown in FIG. 2) if the foundation is dimensioned to extend beneath the insulation, and the insulation is mounted resting on the foundation 6.

By a wall system utilising this principle, the required size of the foundation may be reduced and a thermal bridge through the foundation may be avoided or at least reduced by a wall system according to the invention.

Figure 3:
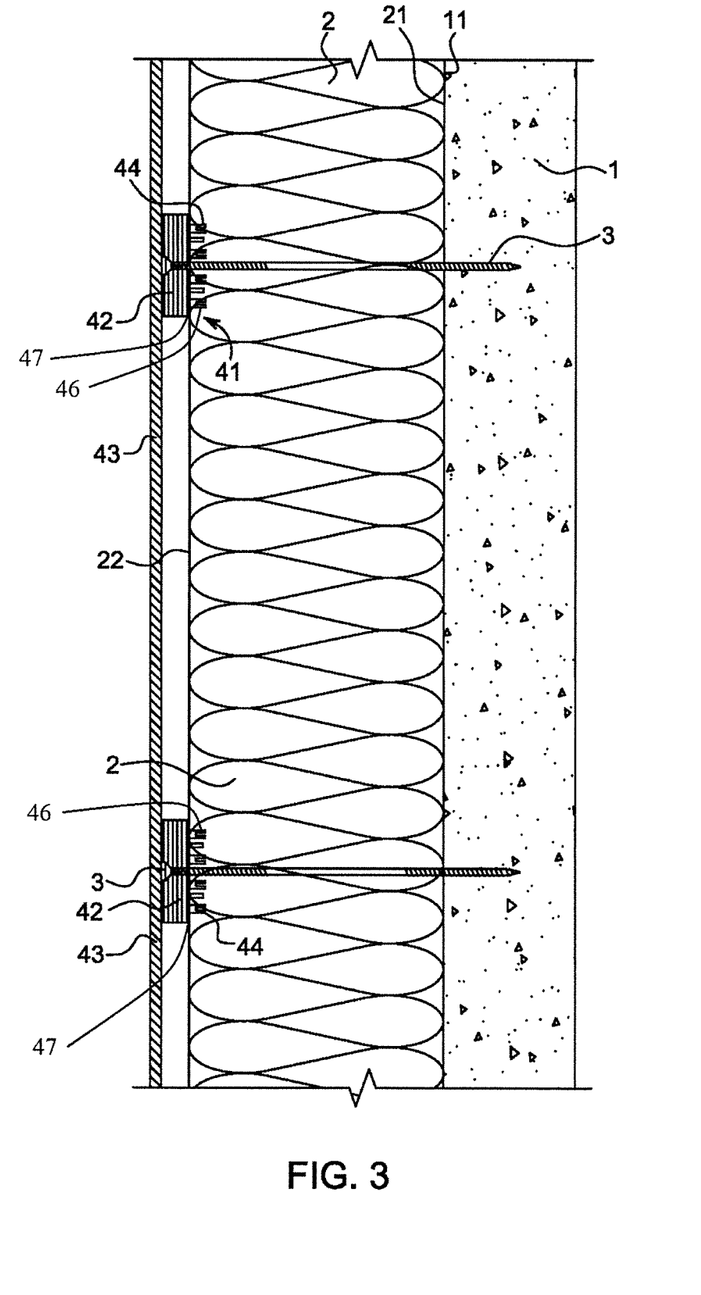
FIG. 3 is a schematic cross-sectional view of an insulating wall system according to a first embodiment of the invention.
Figure 4:
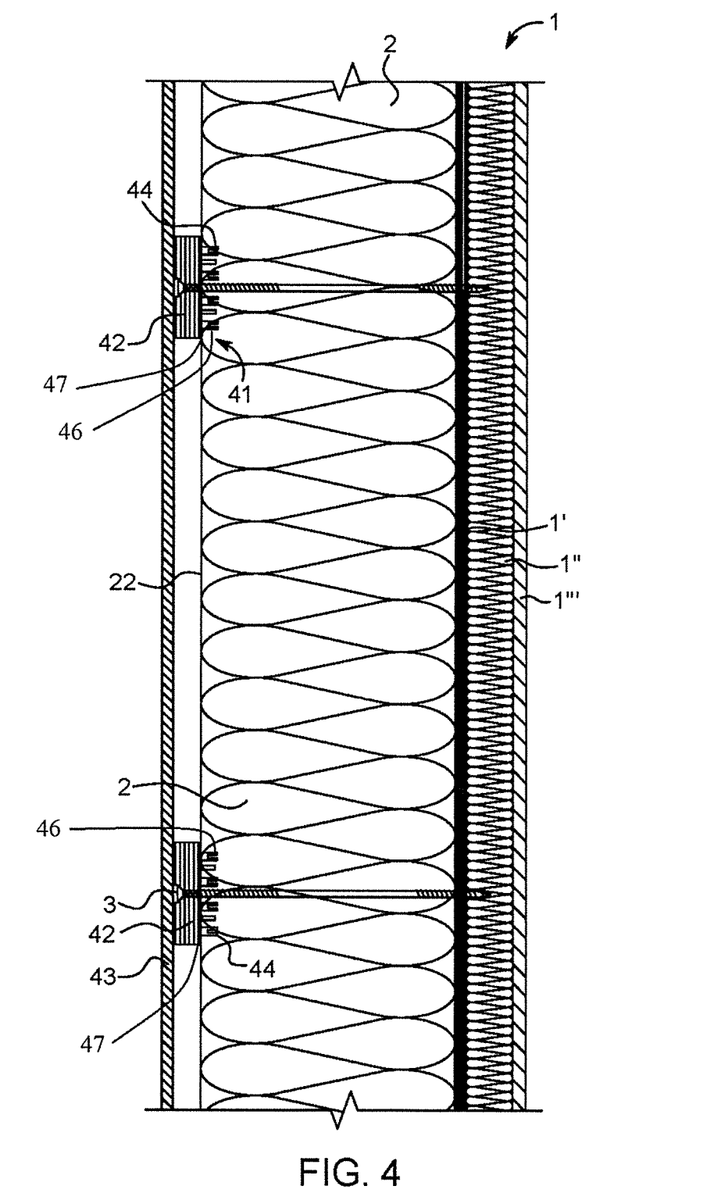
FIG. 4 is a schematic cross-sectional view of an insulating wall system according to a second embodiment of the invention.
Figure 5:
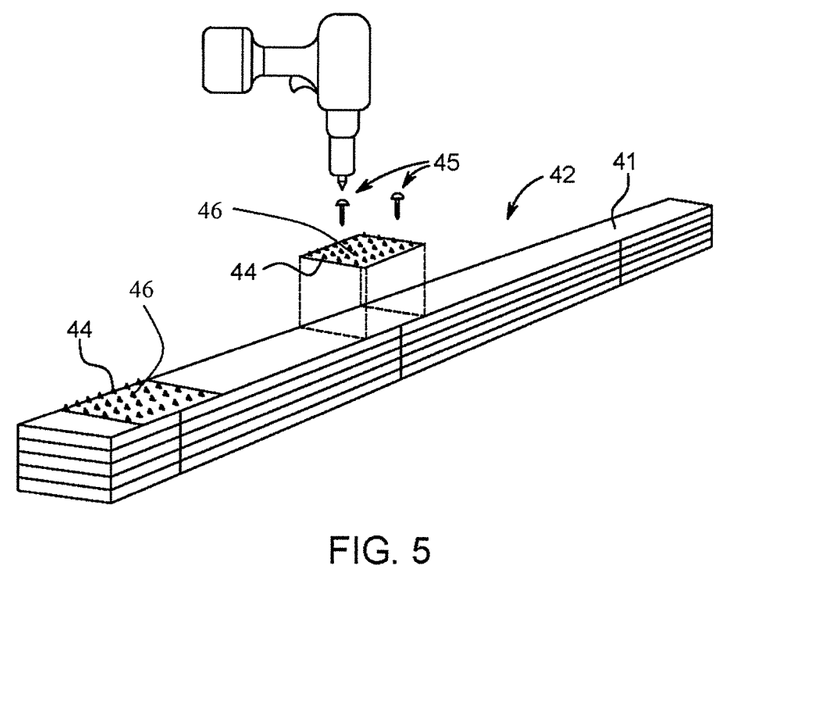
FIG. 5 is a schematic perspective illustration of a support member according to an embodiment of the invention.

According to the present invention and with reference to FIGS. 3 to 6, the elongated support members 42 are provided with a predetermined amount of nail plates 44 on the inner surface 41 of the elongated support member 42 (see FIG. 5). In FIG. 3 is shown an embodiment where the inner wall 1 is a concrete wall, where as the embodiment in FIG. 4 shows an inner wall 1 of a wooden structure with a number of layers 1', 1", 1'". The insulation material 2 is secured to the inner wall 1 by providing elongated support members 42 at predetermined distances from each other on the outer surface 22 of the insulation 2. The elongated support members 42, preferably in the form of LVL planks, are secured to the inner wall 1 by fastening screws 3, i.e. double-threated screws, which penetrate through the insulation material 2 and into the wall 1. Due to the resilient compression of the insulation material 2 the fastening screws 3 are provided with a tension whereby the frictional forces as described above are provided. On the inner side (or rear side) 41 of the wooden planks 42 nail plates 44 are provided with spike 46 penetrating into the outer surface section of the insulation thereby enhancing the grip. The outer façade cladding 43 is secured to the outer surface of the wooden planks 42.

Figure 6:
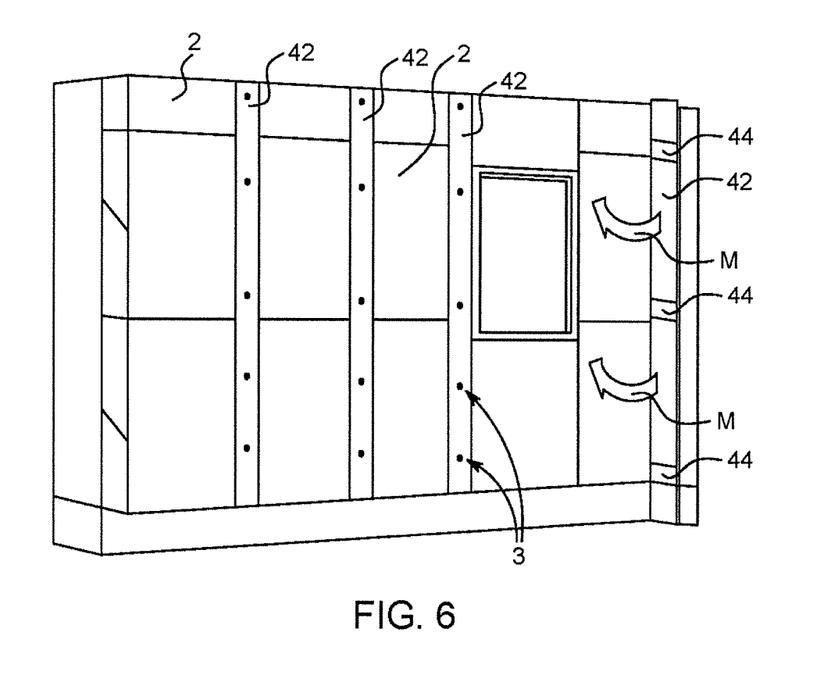
FIG. 6 is a graphic illustration of a building structure with an insulating wall system according to the invention mounted thereon.

As shown in FIG. 5, the nail plates 44 may be mounted to the wooden plank 42 by a builder on the building site by mounting members 45, e.g. screws easily screwed into the plank 42. When mounting the wooden plank having a number of nail plates 44 mounted thereon onto the insulation 2 fitted to the wall 1, the wooden plank 42 may be laid onto the insulation surface and then "rolled" into position as indicated by the arrows in FIG. 6, thereby temporarily securing the wooden plank 42 to the insulation 2 before being finally secured by fastening members 3. Once the insulation 2 is firmly mounted with elongated support members 42 thereon as shown in FIG. 6, the wall system is ready for receiving the outer wall structure, i.e. the façade cladding (not shown in FIG. 6).

In a preferred embodiment of the invention, the insulation material 2 used is a bonded mineral fibre material, but by the invention it is realised that other types of insulation material may be used, such as foam products, e.g. EPS or XPS, or the like.

Figure 7:
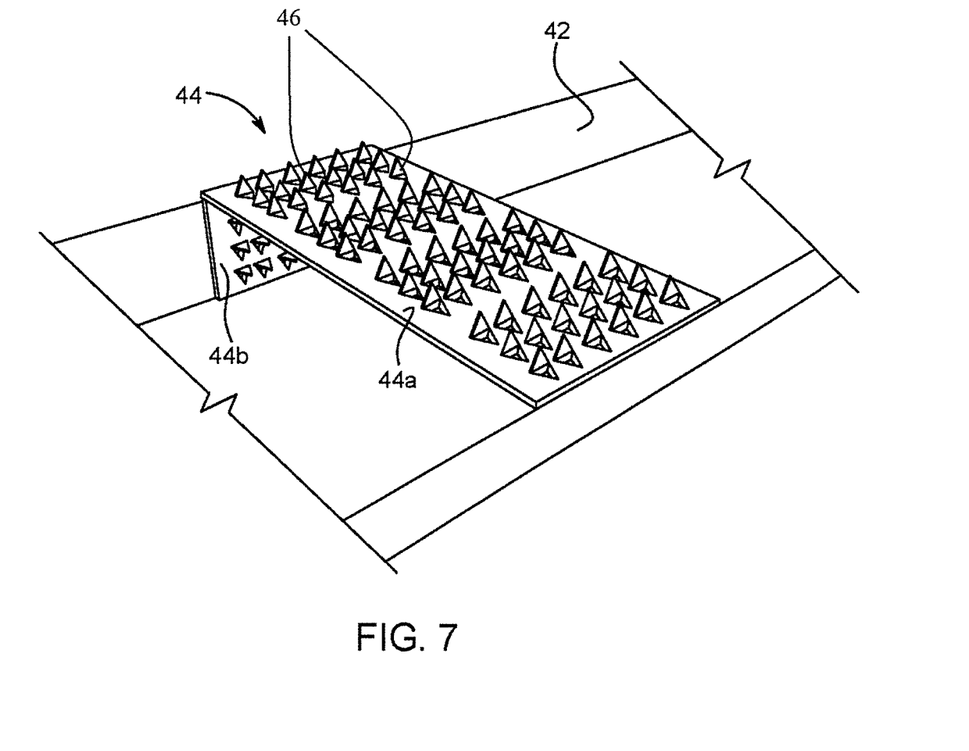
FIG. 7 is a perspective view of a nail plate according to a third embodiment of the invention.

In the embodiments of FIGS. 3 to 5 the nail plates 44 are rectangular plates with a number of spikes 46 projecting out of the plate. The nail plates 44 are attached to the elongated beam by screws 45. In FIG. 7 there is shown an alternative embodiment of the nail plate 44. In this embodiment of FIG. 7, the nail plate 44 is formed as an "angled" nail plate 44 with two portions 44a and 44b provided essentially perpendicular to each other. The first portion 44a is provided with outwardly protruding spikes 46, i.e. spikes or nails projecting away from the surface of the wooden beam 41. The second portion 44b, however, is provided with spikes 46 projecting inwards, i.e. into the wooden beam 41. The two portions 44a and 44b may be formed in a bent metal plate such as a steel plate in which the spikes 46 are punched. The nail plate 44 according to this embodiment is simple to mount on the elongated beam as the spikes 46 of the second portion 44b serves as mounting nails. Accordingly, the nail plate 44 is simply positioned on the wooden beam and then mounted by hammering on the second portion to fix the nail plate to the wooden beam.

By the invention it is realised that the nail plates may also be provided as a continuous metal strip (not shown in the figures) with spikes 46 projecting outwards for penetration into the insulation material. Additionally, the metal nail strip could also be provided with inwardly directed nails for securing the metal nail strip to the wooden beam. The metal strip may be provided in a coil and then rolled out on the wooden beam, cut into the desired length and secured to the elongated support member 42. Alternatively, pieces of the metal nail strip might be cut from a coil into any desired length depending on the needs on site, e.g. to adjust the load bearing characteristics of a corresponding wall system according to the height of a building façade to be insulated.

As described above, the mounting of the nail plates 44 to the elongated support member 42 may be carried out by screws 45 or by "inwardly" directed spikes 46 on the plate 44 for hammering the nail plate 44 onto the wooden elongated support member 42. By the invention, it is realised that other means of mounting the nail plates 44 to the elongated support member 41 may be used. Accordingly, an adhesive mounting 47 could be used, for instance by using adhesive tapes or glue. If the support member 42 is made of a suitable metal, the nail plates could be welded onto the support member.

The elongated support members 42 of the wall system are vertically oriented in the embodiments shown in the figures. However, it is realised that the elongated support members of the wall system may alternatively be horizontally oriented or provided in any other suitable orientation.

Above the invention is described with reference to some preferred embodiments. However, other variants may be provided without departing from the scope of the invention as defined in the accompanying claims. In this regard, it is realised that directional terms, such as "inner", "outer" and the like are merely to be understood as relative terms generally referring to directions, respectively, toward the inside of the building or towards the outside of the building.

The invention claimed is:

1. An insulating wall system for a building structure, comprising:
   a wall having an exterior surface;
   an insulation material disposed on the exterior surface of the wall, the insulation material being a fibrous insulation material having a density of 50 to 100 kg/m$^3$;
   at least one elongated support member having an inner surface and an outer surface, the inner surface generally facing towards the exterior surface of the wall with the insulation material disposed between the exterior surface of the wall and the at least one elongated support member;
   at least one fastening member attaching the at least one elongated support member to the exterior surface of the wall, the at least one fastening member being generally perpendicular to the exterior surface of the wall; and
   at least one nail plate having a first surface and an opposed second surface, the first surface being disposed directly in contact with the inner surface of the elongated support member and the second surface disposed directly in contact with the insulation material, the nail plate further having a plurality of spikes projecting from the second surface and frictionally engaging the insulation material.

2. An insulating wall system according to claim 1, wherein the elongated support member is a wooden beam.

3. An insulating wall system according to claim 1, wherein the elongated support member is a metal beam.

4. An insulating wall system according to claim 1, wherein the plurality of spikes generally projecting perpendicular to the second surface and the plurality of spikes penetrating the insulation material.

5. An insulating wall system according to claim 1, wherein the elongated support member is provided with a plurality of nail plates with a predetermined distance.

6. An insulating wall system according to claim 1, wherein the at least one elongated support member is attached to the wall in a generally vertical orientation.

7. An insulating wall system according to claim 1, wherein the at least one elongated support member is attached to the wall in a generally horizontal orientation.

8. An insulating wall system according to claim 1, wherein the nail plate is attached with the elongated support member by at least one screw.

9. An insulating wall system for a building structure, comprising:
   a wall having an exterior surface;
   an insulation material disposed on the exterior surface of the wall, the insulation material being a fibrous insulation material having a density of 50 to 100 kg/m$^3$;
   at least one elongated support member having an inner surface and an outer surface, the inner surface generally facing towards the exterior surface of the wall with the insulation material disposed between the exterior surface of the wall and the at least one elongated support member;
   at least one fastening member attaching the at least one elongated support member to the exterior surface of the wall, the at least one fastening member being generally perpendicular to the exterior surface of the wall; and
   at least one nail plate having a first surface and an opposed second surface, the first surface being disposed on the inner surface of the elongated support member and the second surface disposed against the insulation material, the nail plate having a plurality of spikes projecting from the second surface and frictionally engaging the insulation material,
   wherein the nail plate further has a plurality of mounting spikes on the first surface, the plurality of mounting spikes generally projecting perpendicular to the first surface and the plurality of mounting spikes penetrating the elongated support member in a generally opposite direction to the spikes projecting from the second surface.

10. An insulating wall system according to claim 1, wherein the nail plate is attached to the elongated support member by an adhesive.

11. An insulating wall system according to claim 1, wherein the first and second surfaces of the nail plate generally parallel to the exterior surface of the wall.

12. An insulating wall system according to claim 1, wherein the at least one fastening member extends through the elongated support member and the nail plate.

* * * * *